(12) United States Patent
Azimi et al.

(10) Patent No.: US 8,081,011 B2
(45) Date of Patent: Dec. 20, 2011

(54) METHOD AND APPARATUS FOR REGULATING A POWER SUPPLY OF AN INTEGRATED CIRCUIT

(75) Inventors: Kouros Azimi, Center Valley, PA (US); Mohammad S. Mobin, Orefield, PA (US); Gregory W. Sheets, Boxborough, MA (US); Lane A. Smith, Easton, PA (US)

(73) Assignee: Agere Systems, Allentown, PA (US)

( * ) Notice: Subject to any disclaimer, the term of this patent is extended or adjusted under 35 U.S.C. 154(b) by 0 days.

(21) Appl. No.: 12/843,139

(22) Filed: Jul. 26, 2010

(65) Prior Publication Data

US 2010/0289476 A1 Nov. 18, 2010

Related U.S. Application Data

(63) Continuation-in-part of application No. 12/012,733, filed on Feb. 5, 2008, now Pat. No. 7,791,368.

(60) Provisional application No. 60/899,684, filed on Feb. 6, 2007.

(51) Int. Cl.
*H03K 17/16* (2006.01)
*H03K 19/003* (2006.01)

(52) U.S. Cl. .................. 326/33; 326/30; 326/32; 326/34

(58) Field of Classification Search .................. None
See application file for complete search history.

(56) References Cited

U.S. PATENT DOCUMENTS

| | | | |
|---|---|---|---|
| 5,155,380 A | 10/1992 | Hwang et al. | |
| 5,208,557 A | 5/1993 | Kersh, III | |
| 5,999,009 A | 12/1999 | Mitsui | |
| 6,020,781 A | 2/2000 | Fujioka | |
| 6,097,113 A | 8/2000 | Teraoka et al. | |
| 6,100,768 A | 8/2000 | Hirayama | |
| 6,127,862 A | 10/2000 | Kawasumi | |
| 6,166,577 A | 12/2000 | Mizuno et al. | |
| 6,222,354 B1 | 4/2001 | Song | |
| 6,310,928 B1 | 10/2001 | Yunome | |
| 6,437,610 B1 | 8/2002 | Schrodinger | |
| 6,466,077 B1 | 10/2002 | Miyazaki et al. | |
| 6,535,013 B2 | 3/2003 | Samaan | |
| 6,560,164 B2 | 5/2003 | Kawai et al. | |
| 6,774,666 B1 | 8/2004 | Samad | |
| 6,980,053 B2 | 12/2005 | Caresosa et al. | |
| 7,053,679 B2 | 5/2006 | Rho | |
| 7,061,337 B2 | 6/2006 | Partovi et al. | |

(Continued)

OTHER PUBLICATIONS

"PWM DC/DC Voltage Regulator Controller," Intersil Americas Inc., ISL62870, Data Sheet FN6708.0, Aug. 14, 2008, pp. 1-16.

(Continued)

*Primary Examiner* — Anh Tran
(74) *Attorney, Agent, or Firm* — Mendelsohn, Drucker & Associates, P.C.; David L. Cargille; Steve Mendelsohn

(57) ABSTRACT

Disclosed is a circuit for adjusting a voltage supplied to an IC by a power supply circuit that produces a regulated-output voltage based on an output-control signal generated by a resistive voltage divider. The circuit includes a PVT detector configured to generate an interface control signal and an interface circuit (i) connected to PVT detector and to the resistive voltage divider and (ii) configured to adjust its resistance in response to the interface control signal. Adjusting the resistance of the interface circuit causes the voltage of the output-control signal to be adjusted, thus causing the power supply circuit to adjust the regulated output voltage.

25 Claims, 10 Drawing Sheets

U.S. PATENT DOCUMENTS

| | | |
|---|---|---|
| 7,301,366 B1 | 11/2007 | Devnath et al. |
| 7,321,254 B2 | 1/2008 | Li et al. |
| 2002/0017946 A1 | 2/2002 | Fujii et al. |
| 2002/0190283 A1* | 12/2002 | Seno et al. .................... 257/275 |
| 2003/0122572 A1 | 7/2003 | Ajit |
| 2004/0012449 A1 | 1/2004 | Illegems |
| 2005/0146965 A1 | 7/2005 | Kim et al. |
| 2005/0195005 A1 | 9/2005 | Choi et al. |
| 2005/0218871 A1* | 10/2005 | Kang et al. .................... 323/265 |
| 2006/0066351 A1* | 3/2006 | Lau ................................ 326/86 |
| 2006/0132243 A1 | 6/2006 | Yamanaka et al. |
| 2007/0018713 A1 | 1/2007 | Tripathi et al. |
| 2007/0018864 A1 | 1/2007 | Khan et al. |
| 2007/0194768 A1 | 8/2007 | Bansal et al. |
| 2007/0210832 A1 | 9/2007 | Abel et al. |

OTHER PUBLICATIONS

"PWM DC/DC Controller with VID Inputs for Portable GPU Core-Voltage Regulator," Intersil Americas Inc., ISL62871, ISL62872, Data Sheet FN6707.0, Aug. 14, 2008, pp. 1-25.

Non-Final Office Action received in U.S. Appl. No. 12/012,733, filed Feb. 5, 2008, dated Aug. 13, 2009.

Notice of Allowability received in U.S. Appl. No. 12/012,733, filed Feb. 5, 2008, dated Feb. 22, 2010.

Notice of Allowability received in U.S. Appl. No. 12/012,733, filed Feb. 5, 2008, dated May 10, 2010.

* cited by examiner

380

580

880

METHOD AND APPARATUS FOR REGULATING A POWER SUPPLY OF AN INTEGRATED CIRCUIT

CROSS-REFERENCE TO RELATED APPLICATIONS

This is a continuation-in-part of co-pending application Ser. No. 12/012,733, which was filed on Feb. 5, 2008 and claims the benefit of U.S. Provisional Application No. 60/899,684 filed Feb. 6, 2007. The teachings of both application Ser. No. 12/012,733 and U.S. Provisional Application No. 60/899,684 are incorporated herein by reference.

BACKGROUND OF THE INVENTION

The present invention relates generally to integrated circuits (ICs) and more specifically to the regulating of a power supply of an IC.

Integrated circuits (ICs) typically include many switching elements, such as transistors. These switching elements are configured to perform a variety of circuit functions.

The operation of a transistor is typically affected by its process, voltage, and temperature ("PVT"). The "process" component of PVT refers to the process of manufacturing a transistor. The process is often classified as "fast", "slow", "nominal", or anywhere in between. A transistor manufactured using a fast process will transmit signals at a faster rate as compared to a transistor manufactured using a slower process. Likewise, a transistor manufactured using a slow process will transmit signals at a slower rate as compared to a transistor manufactured using a faster process. Once a transistor is manufactured using a particular process, the effect of the process is fixed. Thus, the "process" component of PVT cannot be adjusted to change the operating characteristics of a manufactured transistor.

The "temperature" component of PVT is the temperature at which the transistor operates. Similar to the process used to manufacture a transistor, the temperature at which a transistor operates affects how a transistor operates. In particular, the rate at which a transistor transmits a signal is affected by the temperature at which the transistor operates. For example, a transistor operating at a reference temperature requires a first voltage to transmit signals at a first rate. If the temperature of the transistor decreases, less voltage is needed to transmit signals at the first rate. Similarly, if the temperature of the transistor increases, more voltage is needed to transmit signals through the transistor at the first rate. The "temperature" component of PVT varies during operation of the transistor. While there is some control over the temperature of an IC, such temperature cannot be sufficiently adjusted to result in a change in its operating characteristics.

The only component of PVT that can be varied effectively during operation to adjust a transistor's characteristics is its voltage. The optimum supply voltage of a transistor varies depending on the transistor's process (e.g., fast or slow) and the transistor's operating temperature. A conventional solution to the variation in the optimum supply voltage is to set the supply voltage to a worst-case value. In transistors manufactured with a fast process or operating at a low temperature, this conventional solution often results in too much power being supplied to the transistor, with the excess power being dissipated (i.e., wasted).

As an example, if a circuit designer determines (e.g., via simulation of an IC having many transistors) that a transistor manufactured with a slow process needs 3.2 V as a supply voltage, the circuit designer may provide a supply voltage of 3.2 V to each transistor on the IC. If another transistor on the IC was manufactured with a fast process, however, that transistor might only need a supply voltage of 3.0 V. When 3.2 V is supplied, excess power is dissipated on the transistor that only needs 3.0 V as a supply voltage. As the number of transistors on the IC that were manufactured with a fast process (or are operating at a low temperature) increases, the amount of dissipated power increases.

Increased power dissipation on an IC often corresponds to an increase in IC component cost because increased packaging requirements have to be satisfied. This additional packaging results in increased cost for the IC. Also, increased power dissipation often decreases reliability of the IC.

FIG. 1 depicts a conventional method for setting the output voltage of a voltage regulator 112 in a power supply circuit 110 to provide a particular voltage $V_{dd}$ 132 to an IC 130 in a system 100. A resistive voltage divider formed by resistors R1 and R2 provides a voltage-control signal $V_2$ (or feedback signal) to the voltage regulator. Voltage regulator 112 is conventionally designed such that its output voltage $V_{OUT}$ is a function of the output-voltage control signal $V_2$. Resistors R1 and R2 are located externally to IC 130 and may even be located internally to voltage regulator 112. In such a system, the manufacturer of the IC generally has no control over the specific values of resistors R1 and R2, which values ultimately determine the output voltage of the power supply circuit. As a result, the manufacturer of the IC must rely on the designers of system 100 to select appropriate values of resistors R1 and R2 to set the output voltage $V_{OUT}$ of the power supply circuit 110.

Therefore, there remains a need to adjust, via internal components of an IC, the voltage applied to the IC by a power supply.

BRIEF SUMMARY OF THE INVENTION

In accordance with an embodiment of the present invention, the invention is an integrated circuit (IC) comprising an input node configured to receive a power supply voltage (e.g., $V_{dd}$) generated by an external power supply circuit. A PVT detector on the IC is configured to generate an interface control signal based on at least one of process, voltage, and temperature of the IC. An interface circuit on the IC is configured to produce a voltage control signal based on the interface control signal, and the power supply circuit generates the power supply voltage based on the voltage control signal.

In another embodiment, the invention is a method of controlling a power supply voltage (e.g., $V_{dd}$) provided by an external power supply circuit to an IC. An input node of the IC receives the power supply voltage. A PVT detector generates an interface control signal based on at least one of process, voltage, and temperature of the IC. An interface circuit produces a voltage control signal based on the interface control signal, and the power supply circuit generates the power supply voltage based on the voltage control signal.

In another embodiment, the invention is an IC comprising a PVT detector configured to generate an interface control signal based on at least one of process, voltage, and temperature of the IC. An interface circuit on the IC is configured to produce a voltage control signal based on the interface control signal, and a power supply circuit on the IC is configured to produce a maximum power supply voltage for the IC based on the voltage control signal.

In another embodiment, the invention is a method of controlling a positive supply voltage (e.g., Vdd) of an IC. A PVT detector generates an interface control signal based on at least one of process, voltage, and temperature of the IC. An interface circuit produces a voltage control signal based on the interface control signal, and a power supply circuit located on the IC produces the positive supply voltage for the IC based on the voltage control signal.

In another embodiment, the invention is a power supply circuit. The power supply circuit comprises a resistive voltage divider comprising a first resistor connected to a second resistor at a first node. The power supply circuit further comprises a voltage regulator having a voltage-control input connected to said first node and configured to generate a power supply voltage as a function of a voltage level at the voltage-control input. The power supply circuit still further comprises a terminal configured to receive a voltage control signal from an external circuit, said terminal being connected to the first node such that the voltage level at the voltage control input is based on the voltage control signal.

Other aspects, features, and advantages of the present invention will become more fully apparent from the following detailed description, the appended claims, and the accompanying drawings in which like reference numerals identify similar or identical elements.

DETAILED DESCRIPTION

Figure 1:
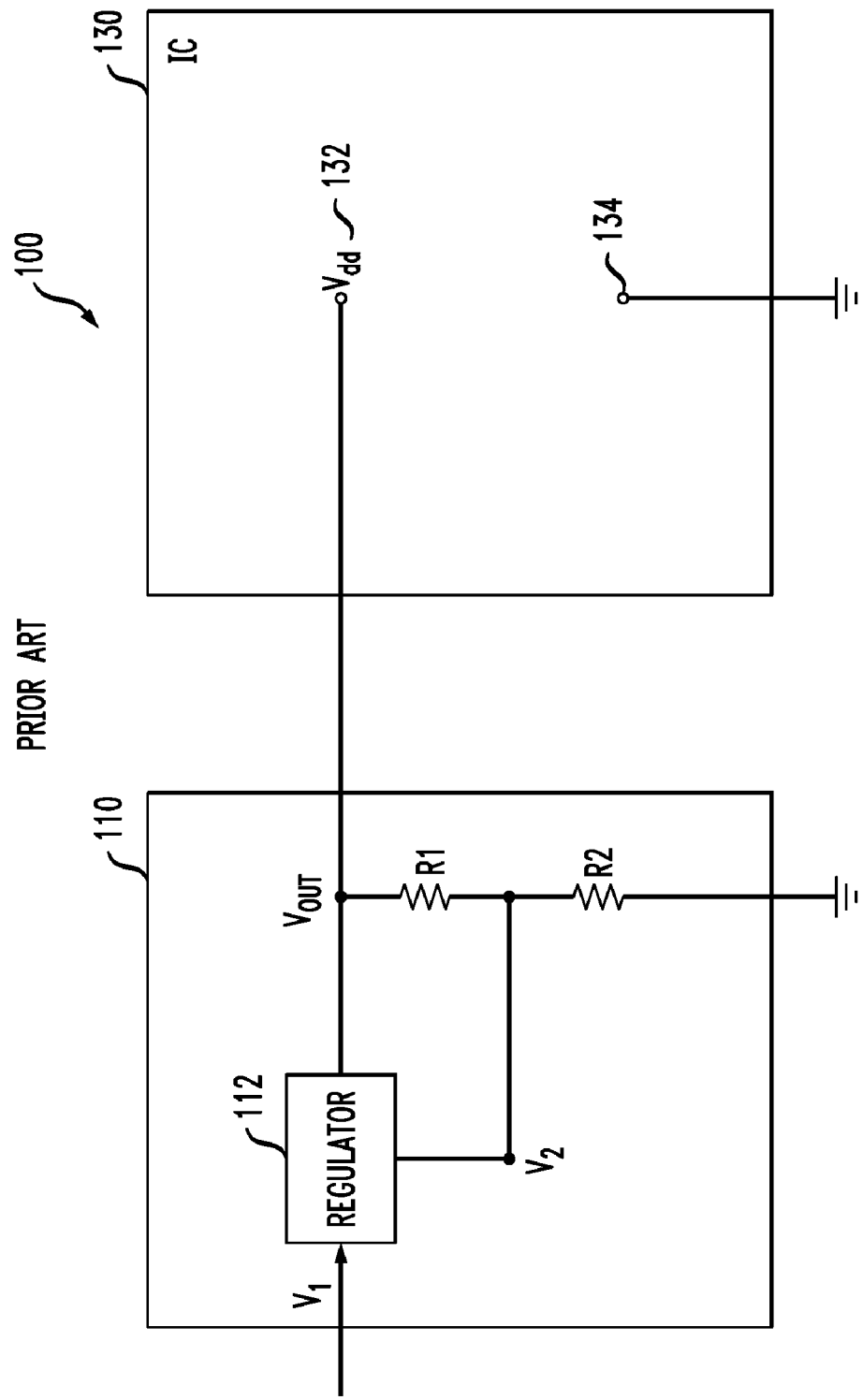
FIG. 1 is a block diagram of a prior-art system having a power supply connected to an IC.
Figure 2:
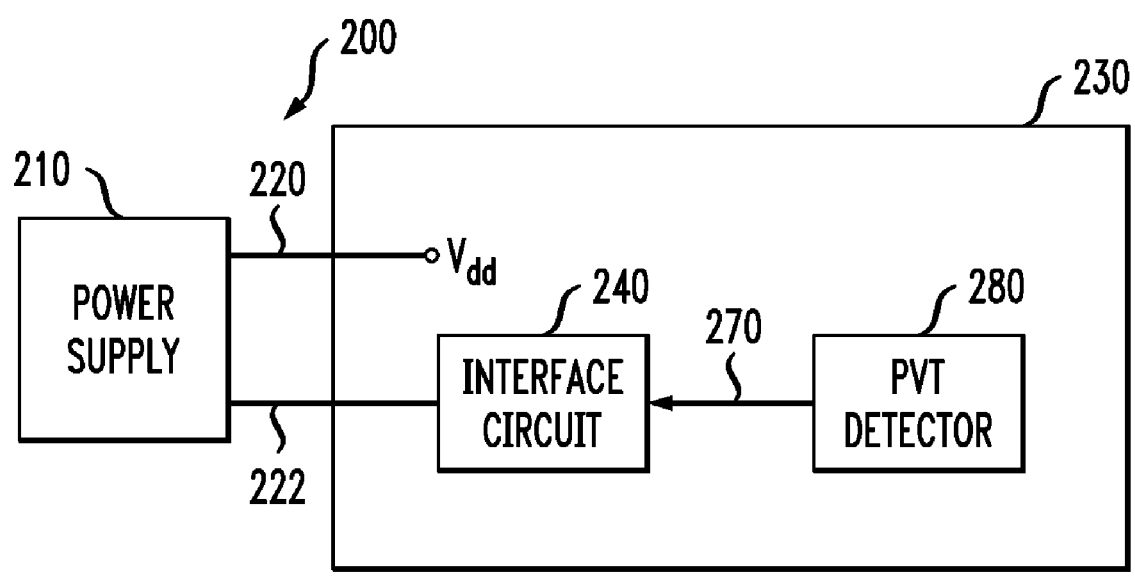
FIG. 2 is a block diagram of a system having a power supply connected to an IC having an interface circuit and a PVT detector in accordance with an embodiment of the present invention.

FIG. 2 is a block diagram of a system 200 comprising an integrated circuit (IC) 230 in communication with an external power supply circuit 210. The IC 230 includes a PVT detector 280 to detect the process, voltage, and/or temperature (PVT) characteristics of transistors on the IC 230. For example, the PVT detector 280 can detect whether a transistor on the IC 230 was manufactured via a fast process or via a slow process. As is known to one of ordinary skill in the art, the PVT detector 280 can perform this detection in a variety of ways, e.g., by using a ring oscillator that produces an output signal with a frequency that is a function of the ring oscillator's process, voltage, and temperature. See, e.g., U.S. Pat. No. 7,321,254, the teachings of which are incorporated herein by reference.

The PVT detector 280 produces an interface control signal 270 that passes to interface circuit 240 (located within IC 230). Interface circuit 240, in turn, produces a voltage control signal 222 based on interface control signal 270. Power supply circuit 210 is adapted to receive voltage control signal 222 and to adjust voltage $V_{dd}$ provided to IC 230 via connection 220 as a function thereof. In certain embodiments, interface circuit 240 has a resistance that is adjusted in response to the interface control signal 270. As described in more detail below, the interface circuit 240 can include, for example, a configuration of one or more resistors and/or a configuration of active elements.

Figure 3:
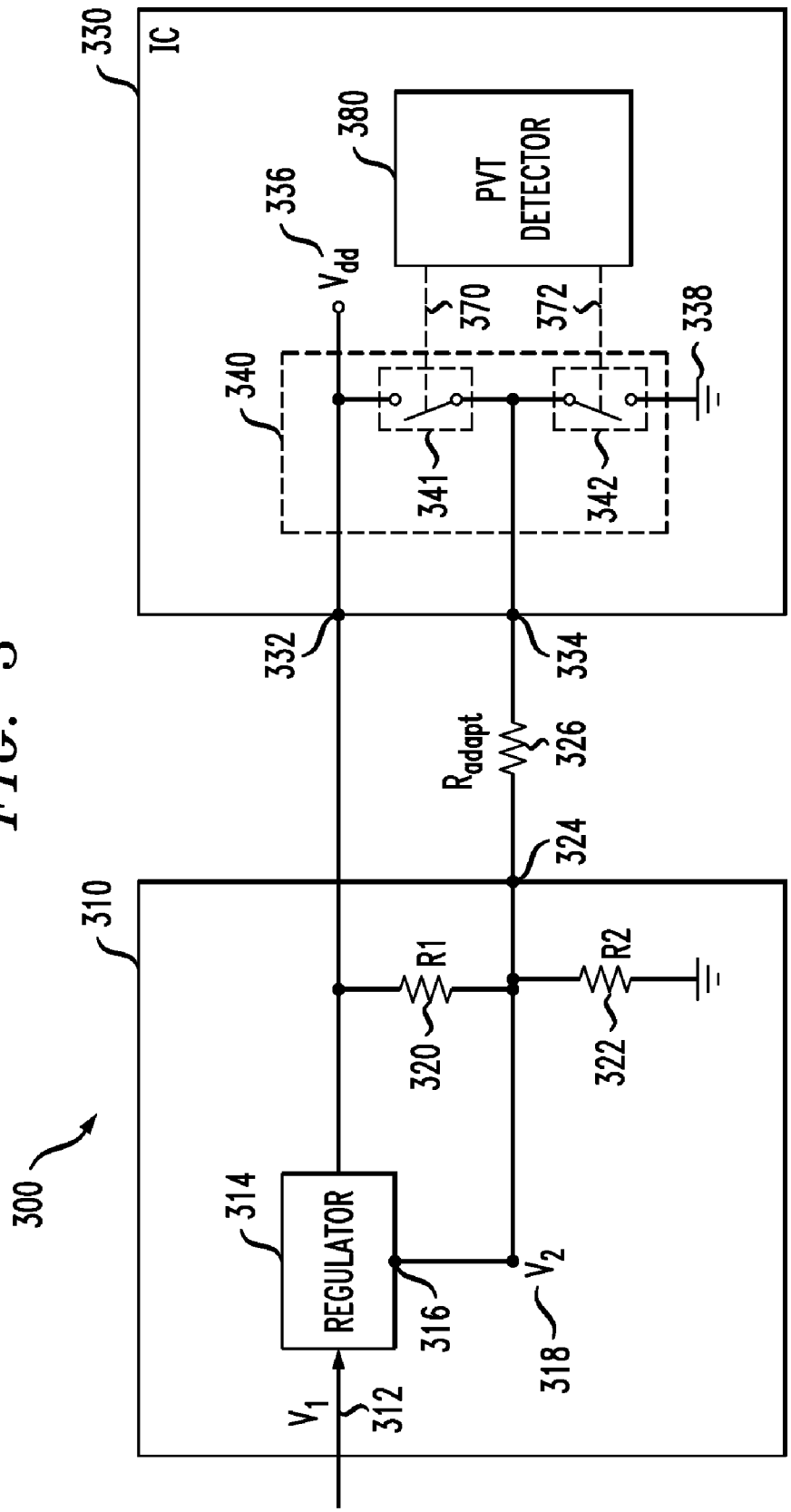
FIG. 3 is a block diagram of a system illustrating an embodiment of the interface circuit of FIG. 2.

A simplified embodiment of an interface circuit is shown in FIG. 3. System 300 includes a power supply circuit 310 in communication with IC 330. The IC 330 includes PVT detector 380 that adjusts the configuration of interface circuit 340 (shown with dashed lines) by generating interface control signals 370, 372. Adjusting the configuration of interface circuit 340 results in a change in the voltage $V_{dd}$ provided by the power supply circuit 310 to IC 330 at input node 332.

The PVT detector 380 controls the configuration of the interface circuit 340 by controlling the opening and closing of switches 341, 342 with interface control signals 370, 372. Each of switches 341, 342 may be implemented as a bipolar or Metal-Oxide-Semiconductive (MOS) transistor or as a three-stateable transmission gate (a.k.a., analog switch) similar to those commercially available in the DS3690 transmission gate integrated circuit manufactured by Maxim Integrated Products, Inc. of Sunnyvale, Calif. This change in configuration effectively adjusts a maximum voltage $V_{dd}$ provided by the power supply circuit 310 to the IC 330 at circuit point 336 (via input node 332).

Power supply circuit 310 includes a regulator 314 that regulates an input voltage $V_1$ 312 to produce the maximum voltage $V_{dd}$ 336 with respect to a minimum voltage (e.g., ground) 338, based on a control signal $V_2$ at node 318 that is input to regulator 314 at a voltage-control input 316. More specifically, regulator 314 is configured to generate the maximum voltage $V_{dd}$ 316 as a function of a voltage level at voltage-control input 316. Power supply circuit 310 further includes a terminal 324 configured to receive a voltage-control signal from interface circuit 340. Terminal 324 is connected to node 318 such that the voltage level at the voltage-control input is based on the voltage-control signal.

The power supply circuit 310 further includes a resistor R1 320 and a resistor R2 322. Resistor R1 320 and a resistor R2 322 form a voltage divider with a load resistor $R_{adapt}$ 326. Load resistor $R_{adapt}$ 326 may be implemented as a fixed resistor external to power supply circuit 310 and IC 330, as shown in FIG. 3. Alternatively, load resistor $R_{adapt}$ 326 may be integrated into either the power supply circuit 310 or IC 330. The configuration of R1 320 and R2 322 with load resistor $R_{adapt}$ 326 is used to provide a different control voltage $V_2$ to regulator 314 at circuit point 318.

Regulator 314 may be implemented using any commercially available regulator controller IC having resistive programming for output voltage control, such as the ISL62870PWM DC/DC Voltage Regulator Controller available from Intersil Corporation in Milpitas, Calif. See, e.g., Intersil Corporation, ISL62870 Datasheet, No. FN6708.0 (Aug. 14, 2008), the teachings of which are incorporated herein by reference.

In a default state, both of switches 341, 342 are in an "open" condition. As such, the nominal voltage $V_{2,NOM}$ of control voltage $V_2$ is given by the following equation:

$$V_{2,NOM} = \frac{V_{dd}(R2)}{R1 + R2}$$

The control voltage $V_2$ at circuit point 318 is adjusted according to whether the load resistor $R_{adapt}$ 326 is connected to the maximum voltage $V_{dd}$ 336 or the minimum voltage 338 (e.g., ground), which depends on the configuration of the switches 341, 342. Specifically, if switch 342 is closed and switch 341 is open, then the circuit point 334 and, therefore, the load resistor $R_{adapt}$ 326 are connected to minimum voltage. In this first case, the formula for the voltage at circuit point 318 of the system 300 is:

$$V_{2, MIN} = \frac{V_{dd}(R2 \| R_{adapt})}{R1 + (R2 \| R_{adapt})}$$

where $$R2 \| R_{adapt} = \frac{(R2)(R_{adapt})}{R2 + R_{adapt}}.$$

If switch 342 is open and switch 341 is closed, however, then the circuit point 334 and, therefore, the load resistor $R_{adapt}$ 326 are connected to maximum voltage $V_{dd}$ 336. In this second case, the formula for the voltage at circuit point 318 of the system 300 is:

$$V_{2, MAX} = \frac{V_{dd}(R2)}{(R1 \| R_{adapt}) + R2}$$

where $$R1 \| R_{adapt} = \frac{(R1)(R_{adapt})}{R1 + R_{adapt}}.$$

Thus, when switch 341 is closed and switch 342 is open, the control voltage $V_2$ at circuit point 318 will be a maximum voltage $V_{2,MAX}$. When switch 342 is closed and switch 341 is open, the control voltage $V_2$ at circuit point 318 will be a minimum voltage $V_{2,MIN}$. When the control voltage $V_2$ is at the maximum voltage $V_{2,MAX}$, regulator 314 produces a maximum output voltage $V_{dd,MAX}$. Conversely, when the control voltage $V_2$ is at the minimum voltage $V_{2,MIN}$, regulator 314 produces a minimum output voltage $V_{dd,MIN}$.

If the PVT detector 380 determines that the voltage $V_{dd}$ being supplied to transistors on the IC 330 is resulting in excess power being dissipated, then the control voltage $V_2$ at circuit point 318 needs to be decreased. As a result, the PVT detector 380 closes switch 342 and opens switch 341, thus decreasing control voltage $V_2$ and causing regulator 314 to decrease voltage $V_{dd}$. If the PVT detector 380 determines that the voltage $V_{dd}$ being supplied to transistors on the IC 330 is too low, then the control voltage $V_2$ at circuit point 318 needs to be increased. As a result, the PVT detector 380 closes switch 341 and opens switch 342, thus increasing control voltage $V_2$ and causing regulator 314 to increase voltage $V_{dd}$. The PVT detector 380 can determine the voltage $V_{dd}$ supplied to the transistors on the IC 330 in a variety of ways known to one of ordinary skill in the art.

In one embodiment, the PVT detector 380 may determine that the voltage at circuit point 318 needs to be increased when the PVT detector 380 determines that the process used to generate some or all of the transistors on the IC 330 was a slow process. In another embodiment, the PVT detector 380 determines that the voltage at circuit point 318 needs to be increased when the PVT detector 380 determines that the temperature of one or more transistors on the IC 330 is increasing. In still another embodiment, the PVT detector 380 determines that the voltage at circuit point 318 needs to be increased when the PVT detector 380 determines that a frequency of oscillation of a ring oscillator is less than a predetermined frequency.

It should be understood that, although the voltage level of voltage $V_{dd}$ is described in the above paragraphs as a positive function of control voltage V2 at circuit point 318, regulator 314 may also be adapted to produce voltage $V_{dd}$ as a negative function of control voltage $V_2$. In such an embodiment, the control of switches 341, 342 by PVT detector would be opposite to that described above. For example, if the PVT detector 380 determined that the voltage $V_{dd}$ being supplied to transistors on the IC 330 is resulting in excess power being dissipated, then the control voltage at circuit point 318 would need to be increased, rather than decreased, in such an embodiment.

Figure 4:
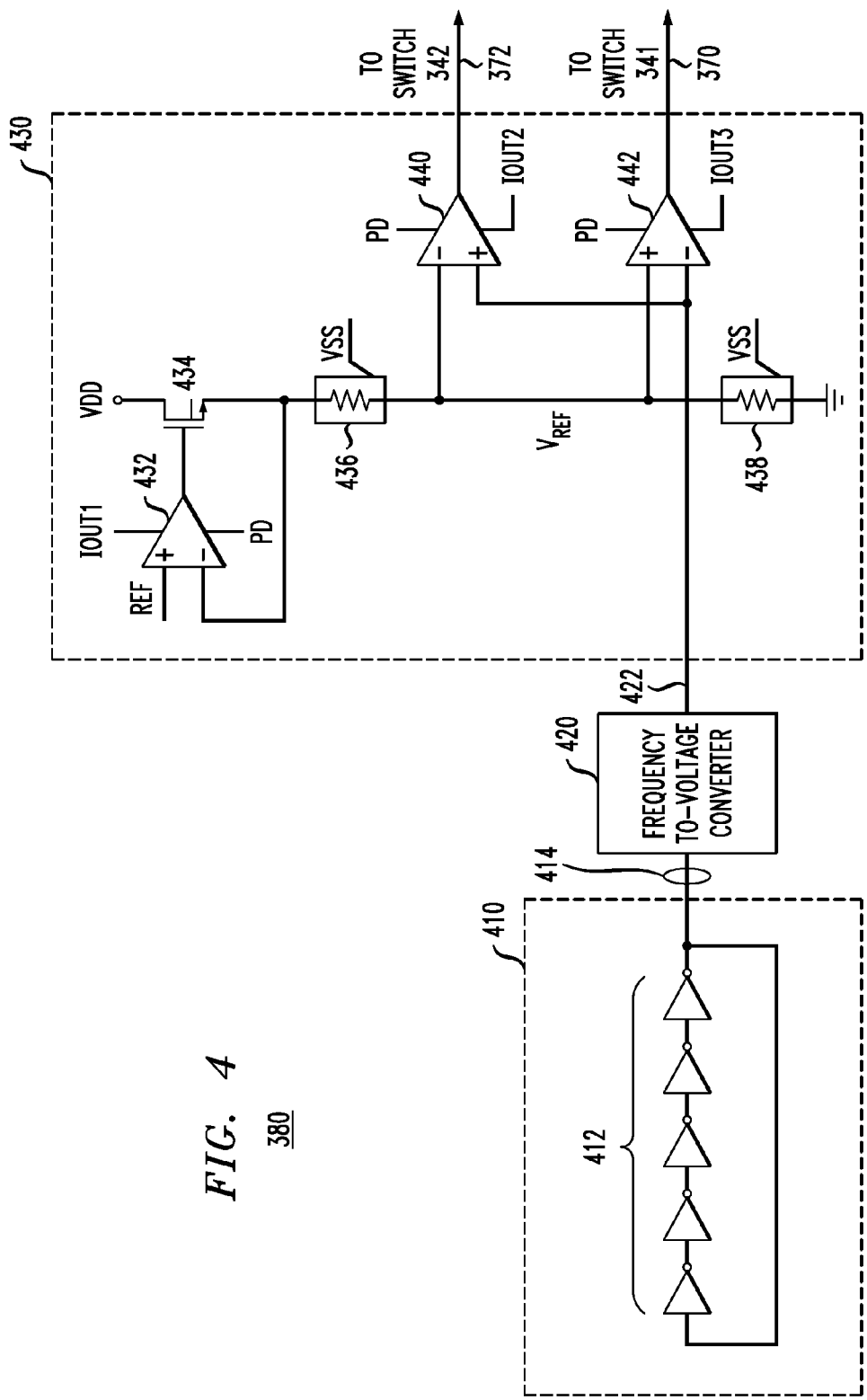
FIG. 4 is a block diagram of an exemplary embodiment of the PVT detector of FIG. 3.

FIG. 4 depicts an exemplary embodiment of PVT detector 380, comprising a ring oscillator 410, a frequency-to-voltage converter 420, and a control circuit 430. Ring oscillator 410 comprises a plurality of interconnected inverting buffers 412 that form a loop. Ring oscillator 410 oscillates and produces a signal 414 having a frequency that is dependent upon (i) the process with which integrated circuit 330 was manufactured, (ii) supply voltage $V_{dd}$, and (iii) the temperature of ring oscillator 410. Frequency-to-voltage converter 420 is adapted to receive signal 414 and to produce a signal 422 that has a voltage proportional to the frequency of signal 414. Suitable implementations for frequency-to-voltage converter 420 are known to those of ordinary skill in the art and include those described in U.S. Pat. Nos. 4,816,704 and 5,514,988, the teachings of which are incorporated herein by reference.

Control circuit 430 receives signal 422 and generates interface control signals Bq and Br to respectively control switches 342 and 341 based thereon. Control circuit 430 comprises two comparators 440, 442 that receive signal 422 at a first input. At a second input, comparators 440, 442 receive a reference voltage $V_{REF}$, which is produced by amplifier 432, buffer transistor 434, and the voltage divider formed by resistors 436, 438. When the voltage of signal 422 is greater than $V_{REF}$, interface control signal Bq closes switch 342, while interface control signal Br opens switch 341. Similarly, when the voltage of signal 422 is less than $V_{REF}$, interface control signal Bq opens switch 342, while interface control signal Br closes switch 341.

Figure 5:
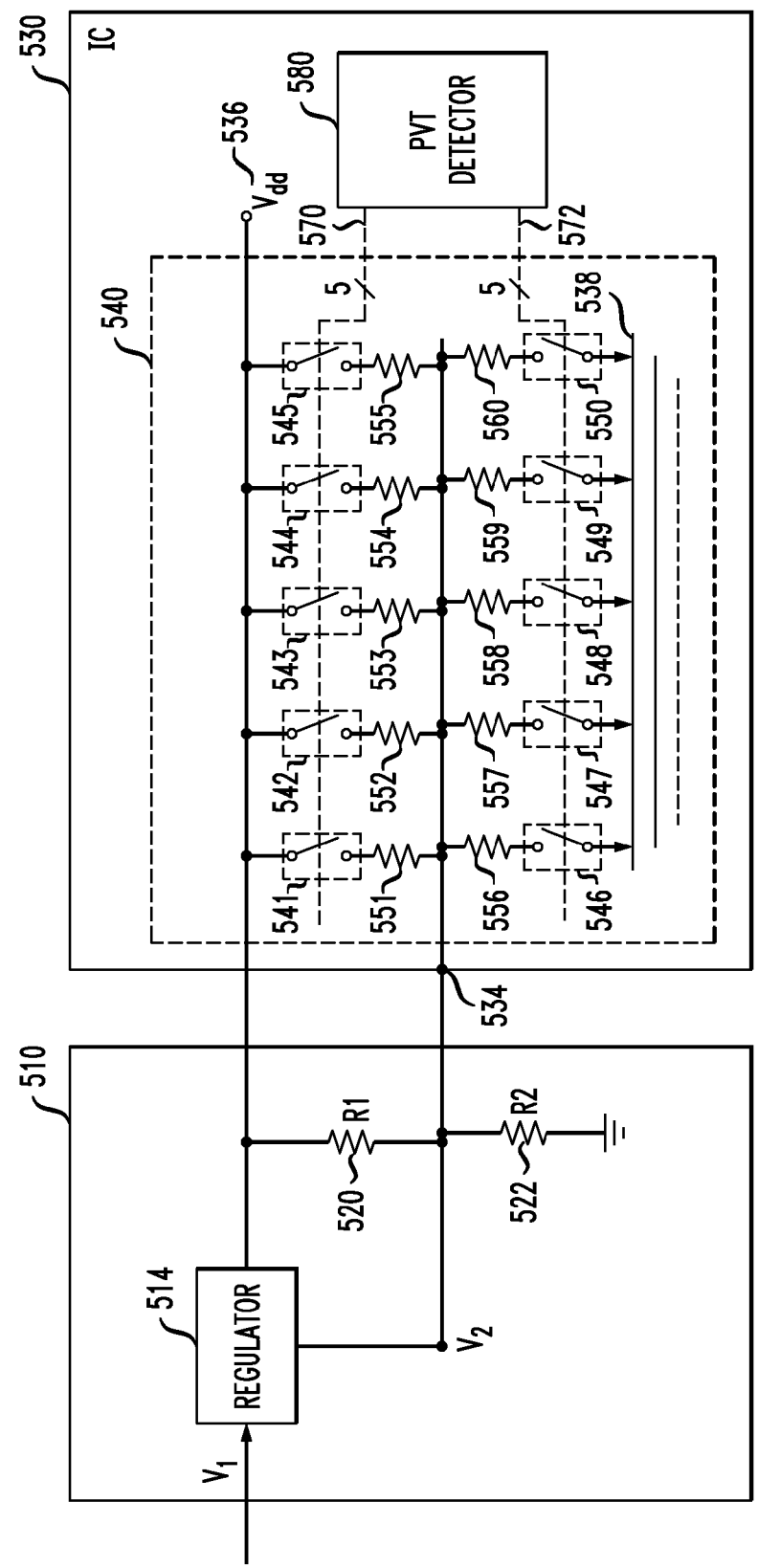
FIG. 5 is a block diagram of a system illustrating another embodiment of the interface circuit of FIG. 2.

Another embodiment of an interface circuit is shown in FIG. 5. System 500 includes an external power supply circuit 510 (with voltage regulator 514) and PVT detector 580 that is internal to an IC 530. System 500 includes a first resistor R1 520 and a second resistor R2 522. These two resistors R1 520 and R2 522 form a voltage divider with the resistance of interface circuit 540 internal to the IC 530.

Interface circuit 540 includes a plurality of individually controllable switches 541-550 connected to a corresponding plurality of resistors 551-560. Each of switches 541-550 may be implemented as a bipolar or metal-oxide-semiconductive (MOS) transistor or as a three-stateable transmission gate (a.k.a., analog switch) similar to those commercially available in the DS3690 transmission gate integrated circuit manufactured by Maxim Integrated Products, Inc. of Sunnyvale, Calif. Interface circuit 540 enables a finer control relative to interface circuit 340 of FIG. 3, because a plurality of resistors can be connected in parallel to adjust the resistance at circuit point 534. For example, any number of switches 541-545 can be turned on to connect corresponding resistors 551-555 in parallel to the maximum voltage $V_{dd}$ 536 and to circuit point 534. Further, any number of switches 546-550 can be turned on to connect corresponding resistors 556-560 in parallel to a minimum voltage (e.g., ground) 538 and to circuit point 534. The PVT detector 580 is coupled to the switches of the interface circuit 540.

The PVT detector 580 controls switches 541-550 so that one or more of the resistors that can be connected to maximum voltage $V_{dd}$ 536, such as resistors 551 and 553, are connected to maximum voltage $V_{dd}$ when the PVT detector 580 determines that the control voltage $V_2$ at circuit point 534 needs to be increased (e.g., in order to cause voltage regulator 514 to increase the magnitude of maximum voltage $V_{dd}$). The PVT detector 580 control switches so that one or more of the resistors that can be connected to minimum voltage 538, such as resistors 556 and 559, are connected to minimum voltage 538 when the PVT detector 580 determines that the control voltage $V_2$ at circuit point 534 needs to be decreased (e.g., in order to cause voltage regulator 514 to decrease the magnitude of maximum voltage $V_{dd}$).

Figure 6:
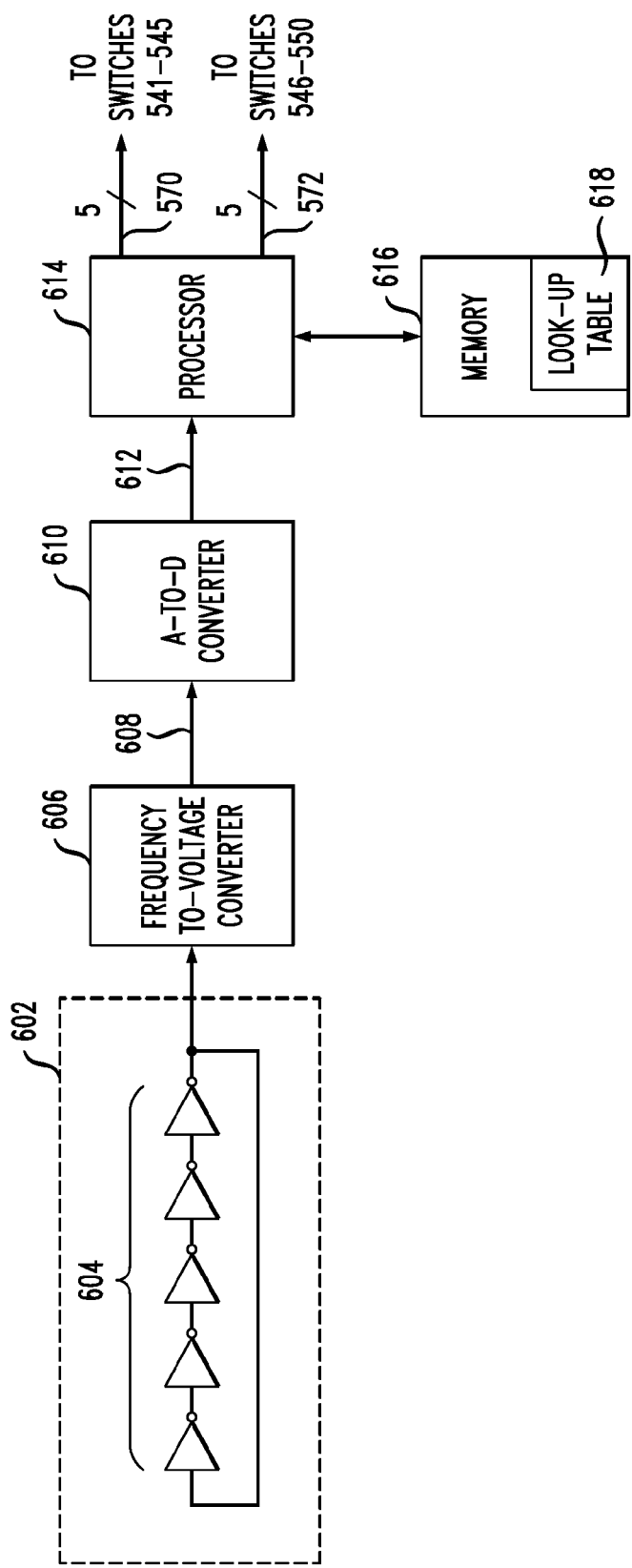
FIG. 6 is a block diagram of an exemplary embodiment of the PVT detector of FIG. 5.

FIG. 6 depicts an exemplary embodiment of PVT detector 580. Like PVT detector 330, PVT detector 580 comprises a ring oscillator 602 having interconnected inverting buffers 604 and a frequency-to-voltage converter 606. In PVT detector 580, however, the signal 608 from frequency-to-voltage converter 606 is converted by analog-to-digital converter 610 to a digital signal 612 that is then passed to a processor 614 connected to a memory 616. Processor 614 is preferably a microprocessor, but may alternatively be a microcontroller or an application-specific integrated circuit (ASIC). Memory 616 contains look-up table 618, in which are stored the switch settings of switches 541-550 that are needed to obtain a desired resistance of interface circuit 540.

Figure 7:
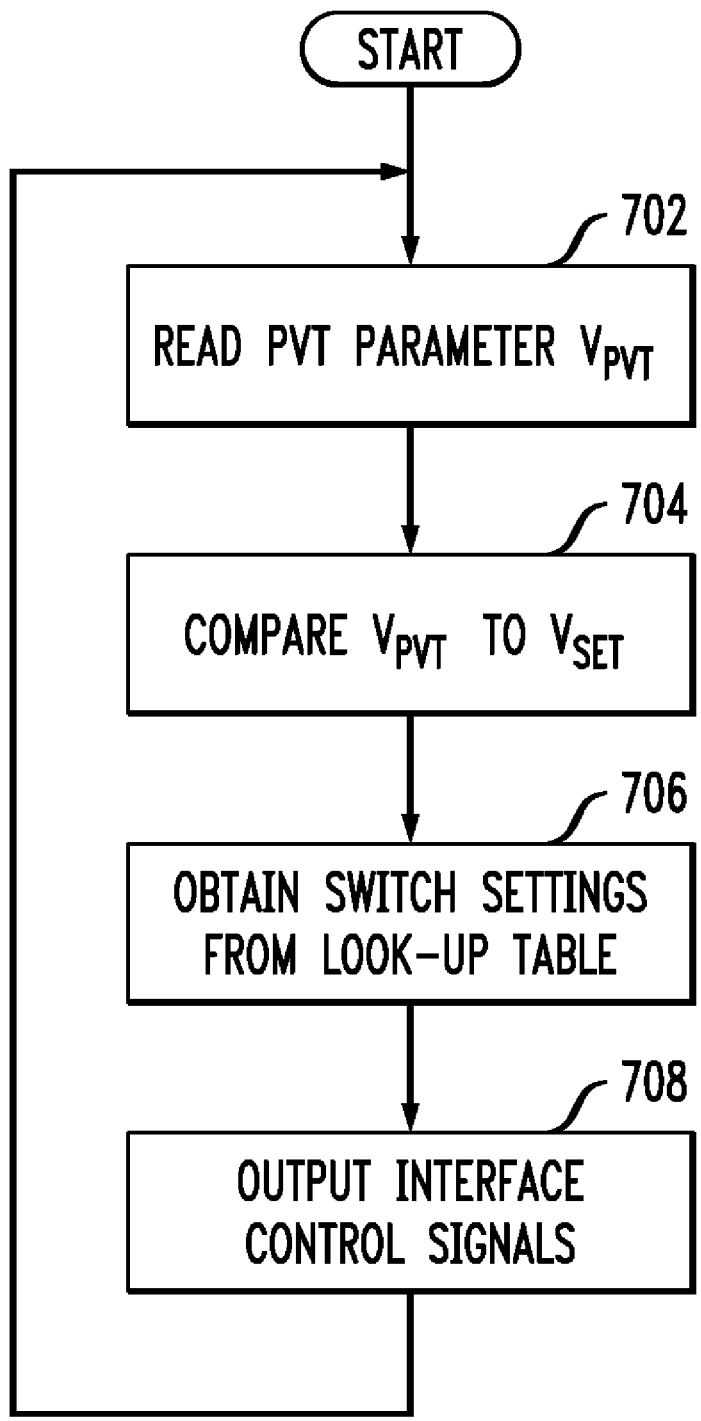
FIG. 7 depicts exemplary operation of the processor of FIG. 6.

FIG. 7 depicts exemplary operation of processor 614. In step 702, processor 614 reads a value $V_{PVT}$ of digital signal 612, which value is a digital representation of the voltage produced by frequency-to-voltage converter 606. In step 704, processor 614 compares value $V_{PVT}$ to a predetermined setpoint value $V_{SET}$. Based on the comparison and upon the current switch configuration, in step 706, processor 614 obtains from look-up table 618 new switch settings suitable to increase or decrease the resistance of interface circuit 540, as appropriate. Finally, in step 708, processor 614 outputs interface control signals 570, 572 to switches 541-550.

Figure 8:
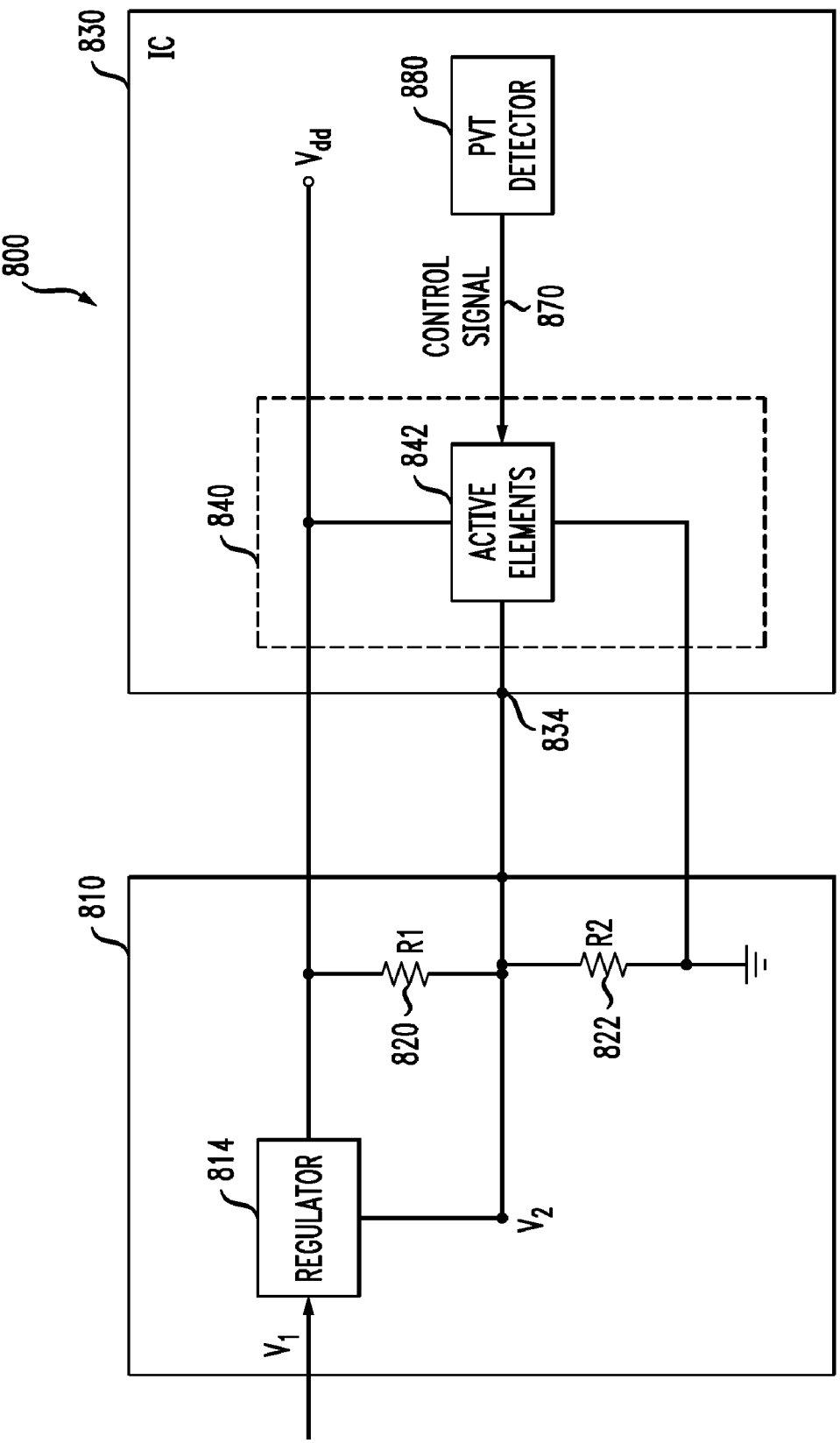
FIG. 8 is a block diagram of a system illustrating another embodiment of the interface circuit of FIG. 2.

Another embodiment of an interface circuit is shown in FIG. 8. System 800 includes an external power supply circuit 810 (with voltage regulator 814) being controlled by a PVT detector 880 that is internal to an IC 830. System 800 includes a first resistor R1 820 and a second resistor R2 822. These two resistors R1 820 and R2 822 form a voltage divider with interface circuit 840 internal to the IC 830.

Interface circuit 840 includes one or more active elements 842, such as bipolar or Metal Oxide Semiconductor (MOS) transistors. The active elements 842 provide a finer control of the resistance at circuit point 834 of the IC 830 than the previously described embodiments. Specifically, the active elements 842 provide a resistance that is not limited to discrete resistance levels.

PVT detector 880 controls the resistance of the interface circuit 840 by transmitting an interface control signal 870 to the active elements 842. In response to the interface control signal 870, the active elements 842 adjust their collector-emitter or drain-source resistances in order to adjust the resistance of the interface circuit 840. For example, the active elements 842 may be set to a particular collector-emitter or drain-source resistance based on the interface control signal 870. The interface control signal 870 is based on one or more PVT characteristics of transistors on the IC 830.

Figure 9:
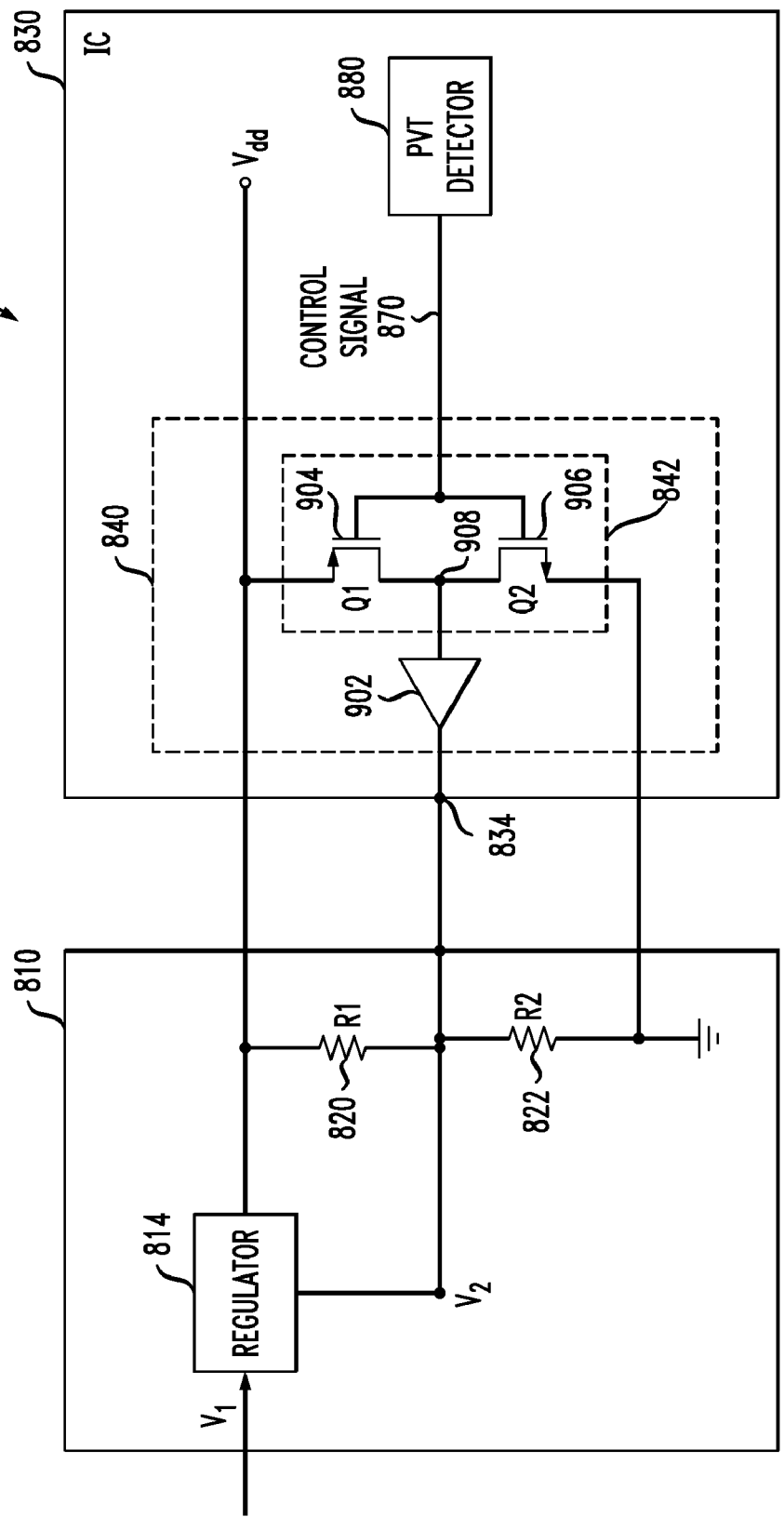
FIG. 9 is a more-detailed block diagram of the system shown in FIG. 8.

FIG. 9 is a more-detailed block diagram of the system shown in FIG. 8. In the embodiment shown in FIG. 9, the active elements 842 comprise a p-type MOS transistor Q1 904 and an n-type MOS transistor Q2 906, which are preferably configured to operate in their triode regions. The drain-source resistances of transistors Q1 and Q2 are adjusted as a function of the interface control signal 870. In particular, as the voltage of interface control signal 870 increases, the drain-source resistance of transistor Q1 increases, and the drain-source resistance of transistor Q2 decreases. The system further includes a buffer 902 that isolates node 834 from node 908.

Figure 10:
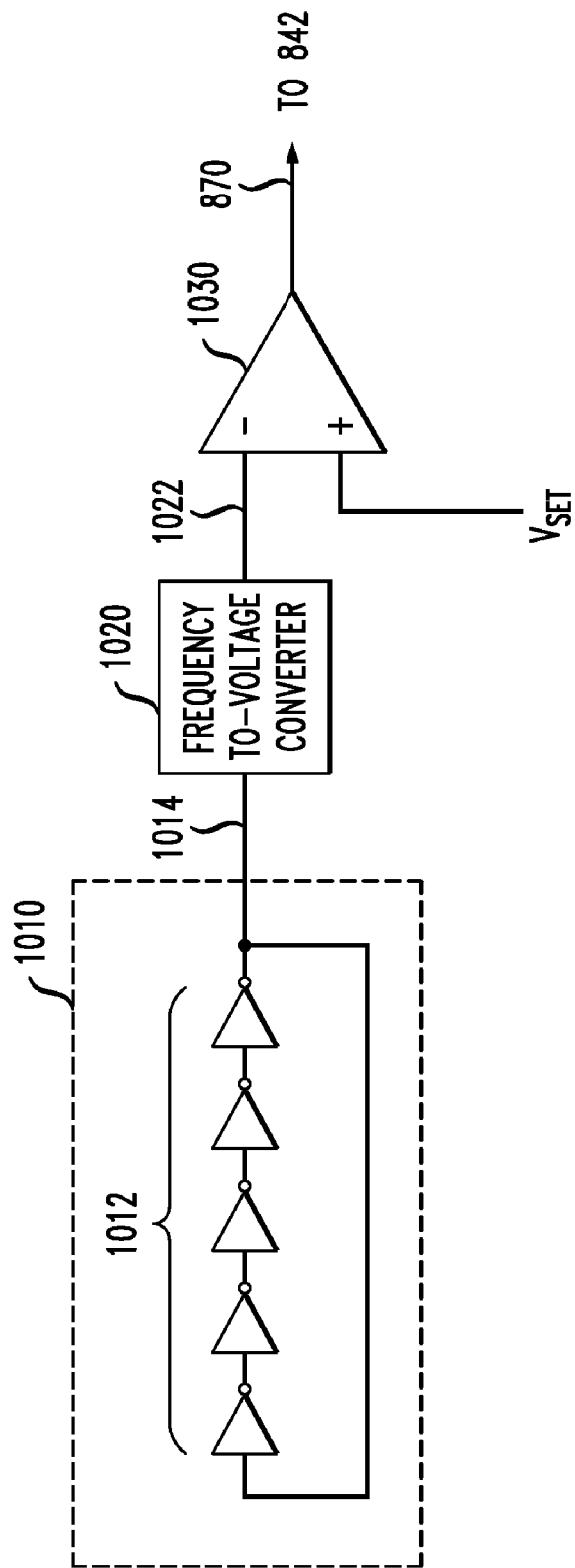
FIG. 10 is a block diagram of an exemplary embodiment of the PVT detector of FIGS. 8 and 9.

FIG. 10 depicts an exemplary embodiment of PVT detector 880. Like PVT detectors 330 and 580, PVT detector 880 comprises a ring oscillator 1010 having interconnected inverting buffers 1012 connected to a frequency-to-voltage converter 1020 via connection 1014. In PVT detector 880, however, the signal 1022 from frequency-to-voltage converter 1020 is connected to one input of an analog difference amplifier 1030, while the other input of difference amplifier 1030 is connected to a setpoint voltage $V_{SET}$. When the voltage of the signal 1022 is greater than the setpoint voltage $V_{SET}$, differential amplifier 1030 outputs a lower voltage to interface circuit 840, thus reducing the resistance of transistor Q2 906 (shown on FIG. 9) and increasing the resistance of transistor Q1 904. Conversely, when the voltage of the signal 1022 is less than the setpoint voltage $V_{SET}$, differential amplifier 1030 outputs a higher voltage to interface circuit 840, thus increasing the resistance of transistor Q2 906 (shown on FIG. 9) and decreasing the resistance of transistor Q1 904.

Although power supply circuits 210, 310, 510, and 810 are described above and depicted in the figures as comprising a regulator and discrete resistors external to the regulator, the regulator and resistors may alternatively be integrated together on a single power supply IC. In this case, the power supply circuit may be provided with a terminal that is (i) connected internally to the regulator's output-voltage control input (e.g., node 318) and (ii) suitable for connection to a control terminal of the downstream IC (e.g., circuit point 334 of IC 330).

Alternatively, the various elements of systems 300, 500, and 800 may be integrated on a single integrated circuit. Such an integrated circuit advantageously is adapted to regulate its internal supply voltage $V_{dd}$ as a function of its PVT characteristics.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

For example, although the various embodiments of PVT detectors employ a frequency-to-voltage converter, a frequency-to-current converter may be substituted therefore. In this case, the downstream elements are adapted to receive a current signal output from the frequency-to-current converter.

The present invention may be implemented as (analog, digital, or a hybrid of both analog and digital) circuit based processes, including possible implementation as a single integrated circuit (such as an ASIC or an FPGA), a multi chip module, a single card, or a multi-card circuit pack. As would be apparent to one skilled in the art, various functions of circuit elements may also be implemented as processing blocks in a software program. Such software may be employed in, for example, a digital signal processor, micro controller, or general purpose computer.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Also, for purposes of this description, it is understood that all gates are powered from a fixed voltage power domain (or domains) and ground unless shown otherwise. Accordingly, all digital signals generally have voltages that range from approximately ground potential to that of one of the power domains and transition (slew) quickly. However and unless stated otherwise, ground may be considered a power source having a voltage of approximately zero volts, and a power source having any desired voltage may be substituted for ground. Therefore, all gates may be powered by at least two power sources, with the attendant digital signals therefrom having voltages that range between the approximate voltages of the power sources.

Signals and corresponding nodes or ports may be referred to by the same name and are interchangeable for purposes here.

Transistors are typically shown as single devices for illustrative purposes. However, it is understood by those with skill in the art that transistors will have various sizes (e.g., gate width and length) and characteristics (e.g., threshold voltage, gain, etc.) and may consist of multiple transistors coupled in parallel to get desired electrical characteristics from the combination. Further, the illustrated transistors may be composite transistors.

As used in this specification and claims, the term "output node" refers generically to either the source or drain of a metal oxide semiconductor (MOS) transistor device (also referred to as a MOSFET), and the term "control node" refers generically to the gate of the MOSFET. Similarly, as used in the claims, the terms "source," "drain," and "gate" should be understood to refer either to the source, drain, and gate of a MOSFET or to the emitter, collector, and base of a bi polar device when the present invention is implemented using bi-polar transistor technology.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

The invention claimed is:

1. An integrated circuit (IC) comprising:
    an input node configured to receive a power supply voltage generated by an external power supply circuit;
    a PVT detector configured to generate an interface control signal based on at least one of process, voltage, and temperature of the IC; and
    an interface circuit configured to produce a voltage control signal based on the interface control signal, wherein the power supply circuit generates the power supply voltage based on the voltage control signal, wherein:
        said interface circuit comprises a plurality of switches, and
        the interface control signal from the PVT detector controls said switches.

2. The circuit of claim 1, wherein the interface circuit is configured to produce the voltage control signal by adjusting a resistance as a function of the interface control signal.

3. The circuit of claim 2, wherein the resistance is an input resistance of a terminal of the IC.

4. The circuit of claim 1, wherein said interface circuit comprises a first plurality of resistors, each connected to a corresponding one of said switches.

5. The circuit of claim 4, wherein a terminal on the IC is connected to a maximum voltage through at least one of the first plurality of resistors when its corresponding switch is closed.

6. The circuit of claim 4, wherein said interface circuit comprises a second plurality of resistors, each connected to a corresponding one of the switches.

7. The circuit of claim 6, wherein a terminal on the IC is connected to a minimum voltage (e.g., ground) through at least one of the second plurality of resistors when its corresponding switch is closed.

8. The circuit of claim 1, wherein the interface circuit comprises at least one active element configured to operate in a triode region.

9. The circuit of claim 1, wherein the PVT detector comprises:
    an oscillator that is configured to produce an oscillating signal that is a function of at least one of process, voltage, and temperature of the oscillator;

a converter connected to the oscillator and configured to convert the oscillating signal to a converted signal comprising one of a voltage signal and a current signal; and
a control circuit configured to produce the interface control signal based on the converted signal.

10. A method of controlling a power supply voltage provided by an external power supply circuit to an IC, the method comprising:
an input node of the IC receiving the power supply voltage;
a PVT detector generating an interface control signal based on at least one of process, voltage, and temperature of the IC; and
an interface circuit producing a voltage control signal based on the interface control signal, wherein:
the power supply circuit generates the power supply voltage based on the voltage control signal, and
producing the voltage control signal comprises adjusting the resistance of the interface circuit.

11. The method of claim 10, wherein the resistance is an input resistance of a terminal of the IC.

12. The method of claim 10, wherein adjusting the resistance of the interface circuit comprises connecting at least one resistor to one of a maximum voltage and a minimum voltage in response to the interface control signal.

13. The method of claim 10, wherein adjusting the resistance of the interface circuit comprises controlling the resistance of at least one active element operating in a triode region in response to the interface control signal.

14. The method of claim 10, wherein said generating an interface control signal comprises:
an oscillator producing an oscillating signal that is a function of at least one of process, voltage, and temperature of the oscillator;
a converter converting the oscillating signal to a converted signal comprising one of a voltage signal and a current signal; and
a control circuit producing the interface control signal based on said converted signal.

15. An integrated circuit (IC) comprising:
a PVT detector configured to generate an interface control signal based on at least one of process, voltage, and temperature of the IC;
an interface circuit configured to produce a voltage control signal based on the interface control signal; and
a power supply circuit configured to produce a maximum power supply voltage for the IC based on the voltage control signal,
wherein the interface circuit is configured to produce the voltage control signal by adjusting a resistance as a function of the interface control signal.

16. The circuit of claim 15, wherein said PVT detector comprises:
an oscillator that is configured to produce an oscillating signal;
a converter connected to the oscillator and configured to convert the oscillating signal to a converted signal comprising one of a voltage signal and a current signal; and
a control circuit configured to produce the interface control signal based on the converted signal.

17. A method of controlling a positive supply voltage of an integrated circuit (IC), the method comprising:
a PVT detector generating an interface control signal based on at least one of process, voltage, and temperature of the IC;
an interface circuit producing a voltage control signal based on the interface control signal; and
a power supply circuit located on the IC producing the positive supply voltage for the IC based on the voltage control signal, wherein producing the voltage control signal comprises adjusting the resistance of the interface circuit.

18. The method of claim 17, wherein generating the interface control signal comprises:
an oscillator producing an oscillating signal that is a function of at least one of process, voltage, and temperature of the oscillator;
a converter converting the oscillating signal to a converted signal comprising one of a voltage signal and a current signal; and
a control circuit producing an output control signal based on said converted signal.

19. A power supply circuit, comprising:
a resistive voltage divider comprising a first resistor connected to a second resistor at a first node;
a voltage regulator having a voltage-control input connected to said first node and configured to generate a power supply voltage as a function of a voltage level at the voltage-control input;
a terminal configured to receive a voltage control signal from an external circuit, said terminal being connected to the first node such that the voltage level at the voltage control input is based on the voltage control signal.

20. An integrated circuit (IC) comprising:
an input node configured to receive a power supply voltage generated by an external power supply circuit;
a PVT detector configured to generate an interface control signal based on at least one of process, voltage, and temperature of the IC; and
an interface circuit configured to produce a voltage control signal based on the interface control signal, wherein:
the power supply circuit generates the power supply voltage based on the voltage control signal, and
the interface circuit is configured to produce the voltage control signal by adjusting a resistance as a function of the interface control signal.

21. The circuit of claim 20, wherein the resistance is an input resistance of a terminal of the IC.

22. An integrated circuit (IC) comprising:
an input node configured to receive a power supply voltage generated by an external power supply circuit;
a PVT detector configured to generate an interface control signal based on at least one of process, voltage, and temperature of the IC; and
an interface circuit configured to produce a voltage control signal based on the interface control signal, wherein the interface circuit comprises at least one active element configured to operate in a triode region.

23. An integrated circuit (IC) comprising:
an input node configured to receive a power supply voltage generated by an external power supply circuit;
a PVT detector configured to generate an interface control signal based on at least one of process, voltage, and temperature of the IC; and
an interface circuit configured to produce a voltage control signal based on the interface control signal,
wherein the PVT detector comprises:
an oscillator that is configured to produce an oscillating signal that is a function of at least one of process, voltage, and temperature of the oscillator;
a converter connected to the oscillator and configured to convert the oscillating signal to a converted signal comprising one of a voltage signal and a current signal; and a control circuit configured to produce the interface control signal based on the converted signal.

24. A method of controlling a power supply voltage provided by an external power supply circuit to an IC, the method comprising:
　an input node of the IC receiving the power supply voltage;
　a PVT detector generating an interface control signal based on at least one of process, voltage, and temperature of the IC; and
　an interface circuit producing a voltage control signal based on the interface control signal, wherein:
　　the power supply circuit generates the power supply voltage based on the voltage control signal, and
　　said generating an interface control signal comprises:
　　　an oscillator producing an oscillating signal that is a function of at least one of process, voltage, and temperature of the oscillator;
　　　a converter converting the oscillating signal to a converted signal comprising one of a voltage signal and a current signal; and
　　　a control circuit producing the interface control signal based on said converted signal.

25. An integrated circuit (IC) comprising:
　a PVT detector configured to generate an interface control signal based on at least one of process, voltage, and temperature of the IC;
　an interface circuit configured to produce a voltage control signal based on the interface control signal; and
　a power supply circuit configured to produce a maximum power supply voltage for the IC based on the voltage control signal,
　wherein said PVT detector comprises:
　　an oscillator that is configured to produce an oscillating signal;
　　a converter connected to the oscillator and configured to convert the oscillating signal to a converted signal comprising one of a voltage signal and a current signal; and
　　a control circuit configured to produce the interface control signal based on the converted signal.

\* \* \* \* \*